(12) United States Patent
Weisser et al.

(10) Patent No.: US 6,903,526 B2
(45) Date of Patent: Jun. 7, 2005

(54) ELECTRONICALLY COMMUTATED DC MOTOR COMPRISING A BRIDGE CIRCUIT

(75) Inventors: Wilhelm Weisser, Königsfeld (DE); Walter Heydrich, Georgen (DE); Hermann Rappenecker, Vöhrenbach (DE)

(73) Assignee: ebm-papst St. Georgen GmbH & Co., St. Georgen (DE)

( * ) Notice: Subject to any disclaimer, the term of this patent is extended or adjusted under 35 U.S.C. 154(b) by 0 days.

(21) Appl. No.: 10/493,983

(22) PCT Filed: Mar. 25, 2003

(86) PCT No.: PCT/EP03/03067
§ 371 (c)(1),
(2), (4) Date: Apr. 29, 2004

(87) PCT Pub. No.: WO03/085808
PCT Pub. Date: Oct. 16, 2003

(65) Prior Publication Data
US 2004/0263103 A1 Dec. 30, 2004

(30) Foreign Application Priority Data
Apr. 11, 2002 (DE) .......................................... 102 15 895

(51) Int. Cl.[7] .............................................. H01R 39/46
(52) U.S. Cl. ...................... 318/439; 318/254; 318/138; 318/98
(58) Field of Search ................................ 318/254, 138, 318/439, 268, 800, 811, 139; 358/800, 804

(56) References Cited

U.S. PATENT DOCUMENTS

| | | | |
|---|---|---|---|
| 3,988,654 A | 10/1976 | Takahashi et al. | 318/254 |
| 4,233,524 A | 11/1980 | Burdick | 307/205 |
| 4,376,261 A | 3/1983 | von der Heide et al. | 318/254 |
| 4,379,984 A | 4/1983 | Müller | 318/254 |
| 4,748,388 A | 5/1988 | Müller | 318/354 |
| 4,760,317 A | 7/1988 | Hetzel et al. | 318/254 |

(Continued)

FOREIGN PATENT DOCUMENTS

| | | |
|---|---|---|
| DE | 30 44 056 | 6/1981 |
| DE | 33 31 782 | 8/1985 |
| DE | 35 26 007 | 1/1986 |
| DE | 41 42 274 | 6/1993 |
| DE | 195 17 665 | 11/1996 |

*Primary Examiner*—Karen Masih
(74) *Attorney, Agent, or Firm*—Milton Oliver, Esq.; Ware, Fressola, Van Der Sluys & Adolphson LLP

(57) ABSTRACT

An electronically commutated DC motor comprises a stator comprising at least one stator winding (22, 24, 26), a rotor (28) electromagnetically interacting with the stator, a positive and a negative DC voltage line (76, 78) for supplying power to the motor (20), in particular from a battery (77), a full bridge circuit (74) for controlling the current in the at least one stator winding (22, 24, 26), which full bridge circuit (74) comprises a plurality of bridge arms that each comprise an upper bridge transistor (66, 80, 86) for controlling the current from the positive DC voltage line (76) to an associated terminal (68; 82; 88) of that stator winding (22, 24, 26) as well as a lower bridge transistor (70, 84, 90) for controlling the current from the relevant terminal of the stator winding to the negative DC voltage line (78). The motor further comprises an arrangement for generating a plurality of rotor position signals, and an arrangement for controlling a predetermined bridge transistor by logical combination of rotor position signals associated therewith, there being provided, for logical combination of those rotor position signals, a control transistor (60) to whose base a first rotor position signal (H1) is conveyable and to whose emitter a second rotor position signal (H2) is conveyable, and whose collector signal serves to control the predetermined bridge transistor (66). A circuit comprising a half bridge is also described.

20 Claims, 7 Drawing Sheets

U.S. PATENT DOCUMENTS

| | | | |
|---|---|---|---|
| 4,866,356 A | 9/1989 | Altendorf | 388/811 |
| 5,055,751 A | 10/1991 | MacKelvie | 318/254 |
| 5,457,366 A | 10/1995 | Wehberg et al. | 318/439 |
| 6,163,117 A | 12/2000 | Rappenecker | 318/254 |
| 2003/0173916 A1 * | 9/2003 | Nelson et al. | 318/268 |
| 2003/0175124 A1 * | 9/2003 | Hahn et al. | 417/44.1 |

* cited by examiner

US 6,903,526 B2

ELECTRONICALLY COMMUTATED DC MOTOR COMPRISING A BRIDGE CIRCUIT

CROSS REFERENCE

This application is a section 371 of PCT/EP03/03067, filed 25 Mar. 2003 and published 16 Oct. 2003 in the German language as WO 03-085808-A1. The international application claims priority from German application DE 102 15 895.9, filed 11 Apr. 2002, which is incorporated by reference.

FIELD OF THE INVENTION

The invention concerns an electronically commutated DC motor comprising a full bridge circuit.

BACKGROUND

In such a motor, a plurality of rotor position signals are generated, and the individual semiconductor switches of the full bridge circuit are controlled by combinations of those rotor position signals. If a first rotor position signal is designated H1 and a second signal H2, then (as an example) one semiconductor switch of the full bridge must be switched on when the one signal H1 has the value 1 and the other signal H2 has the value 0. On the other hand, a different semiconductor switch of the full bridge must be switched on, for example, when H2 has the value 1 and H1 the value 0.

For known motors of this kind, signals H1 and H2 are required in non-inverted form, i.e. as H1 and H2, and they are required in inverted form, i.e. as /H1 and /H2. Conjunctive logical combination elements are furthermore needed in order to combine these signals, and a PWM signal often must additionally be taken into account. AND elements are usually used for this purpose.

This results in complex circuits having many components, making it difficult, in the context of small motors, to accommodate the circuit board in the motor housing, and raising the cost of manufacturing the circuit boards (and therefore the motors), since multi-layer circuit boards are required.

SUMMARY OF THE INVENTION

It is therefore an object of the invention to make available a new electronically commutated motor having a full bridge circuit.

According to the invention, this object is achieved by providing a control transistor serving to logically combine the rotor position signals, a first rotor position signal being applied to the base of the control transistor, a second rotor position signal being applied to the emitter, and the collector signal serving to control the current in an associated stator winding. The control transistor effects a logical combination of two rotor position signals in simple fashion and without separate signal inversion, can additionally serve as a level converter as necessary, and allows reciprocal locking of the upper and lower bridge transistors of a bridge arm. The circuit is simplified by way of the invention in such a way that the requisite circuit board can be manufactured easily and inexpensively even for small motors; and installation space is obtained, as applicable, for additional motor functions.

A particularly simple way of achieving the stated object is to use a bridge circuit to control the current in the stator winding phases, at least one transistor in a bridge arm controlling the current from DC voltage supply lines to the respective associated stator winding phase, with the bridge circuit transistors being driven by logically combining rotor position signals. This is a very simple commutation circuit for a low-output three-phase motor, with which the motor can be operated in one predetermined rotation direction.

Further details and advantageous refinements of the invention may be inferred from the exemplary embodiments, in no way to be understood as a limitation of the invention that are described below and depicted in the drawings.

BRIEF FIGURE DESCRIPTION

Figure 1:
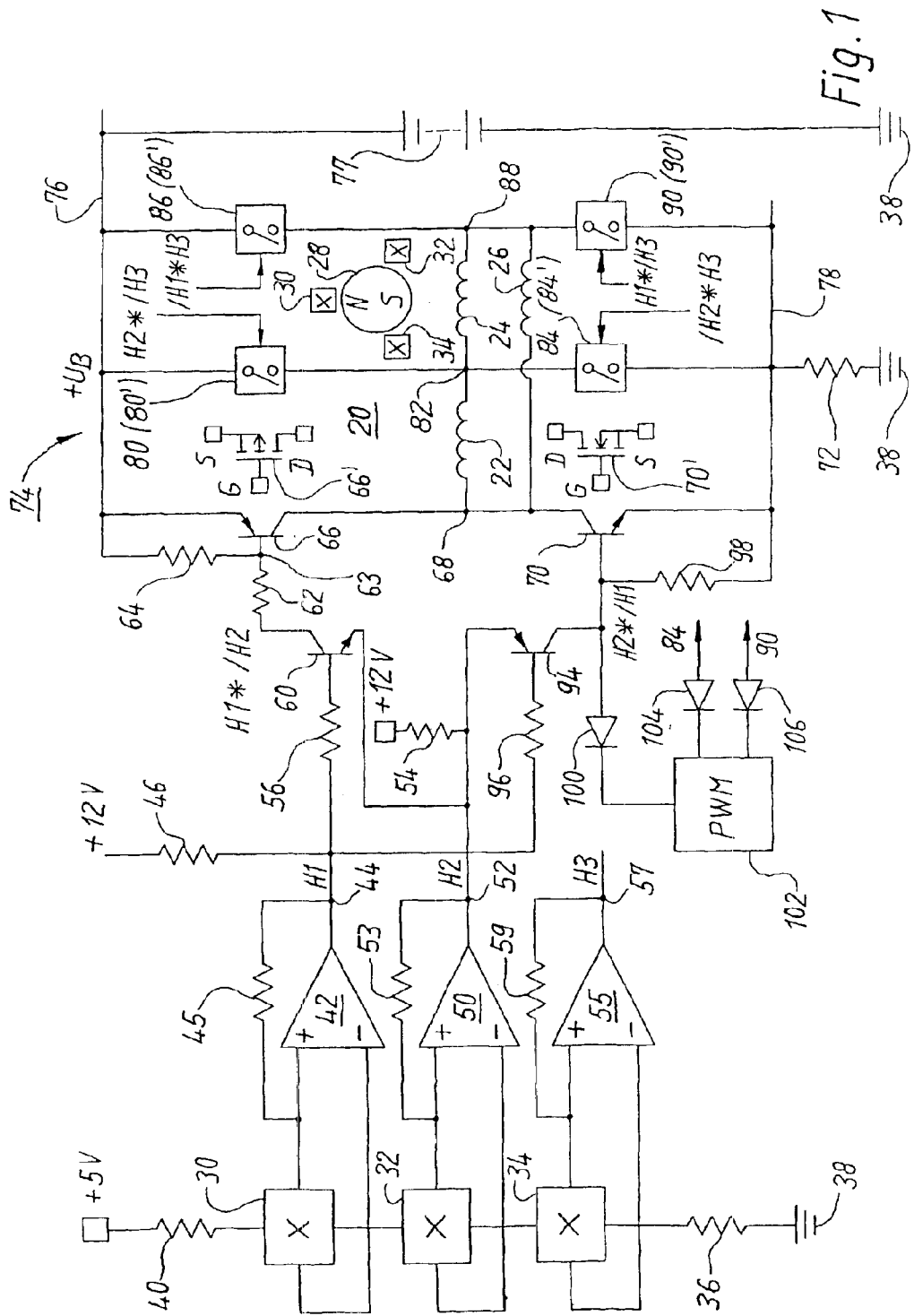
FIG. 1 shows a first embodiment of an electronically commutated DC motor according to the invention, two variants of the invention being depicted in FIG. 1.
Figure 2:
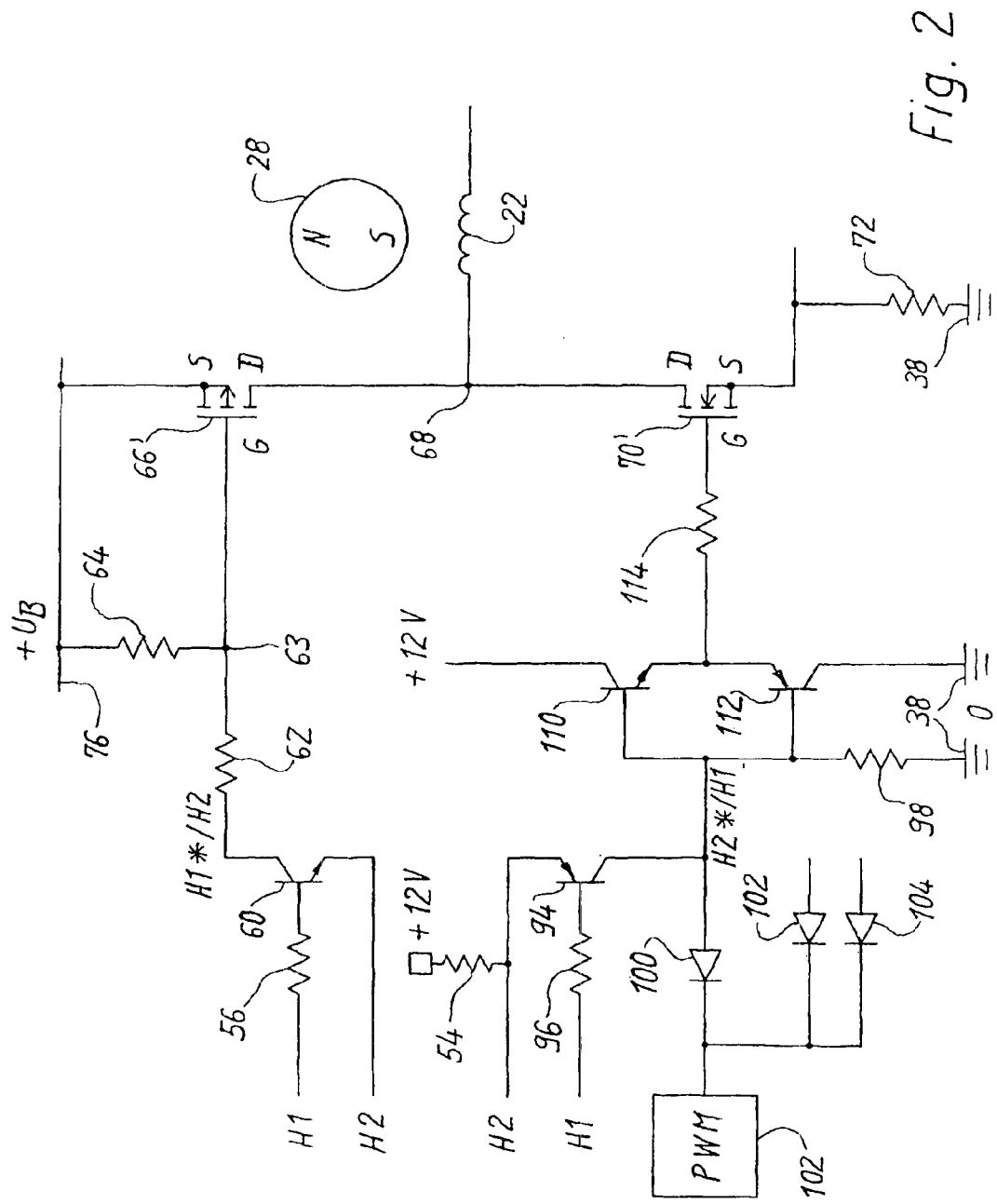
FIG. 2 shows a second embodiment of a motor according to the present invention.
Figure 3:
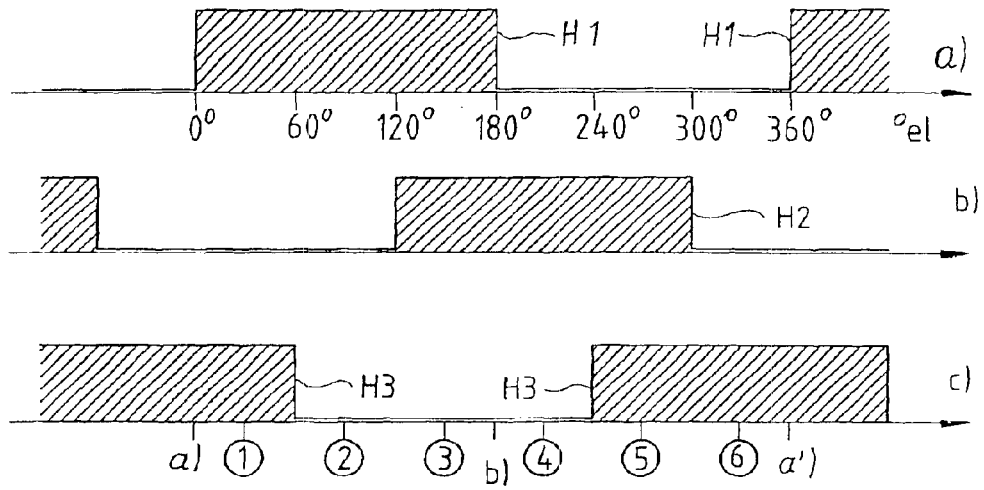
Figure 4:
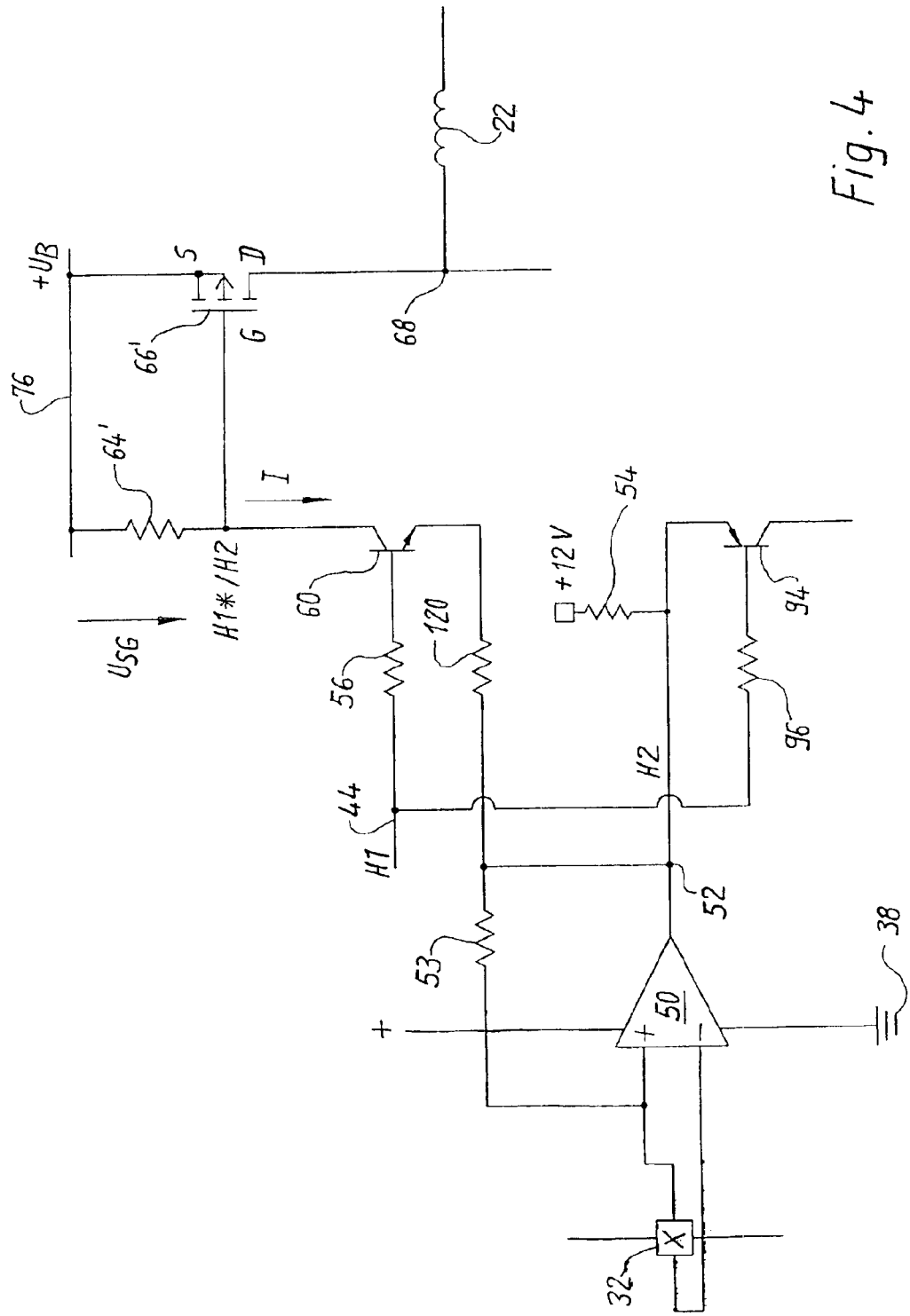
Figure 5:
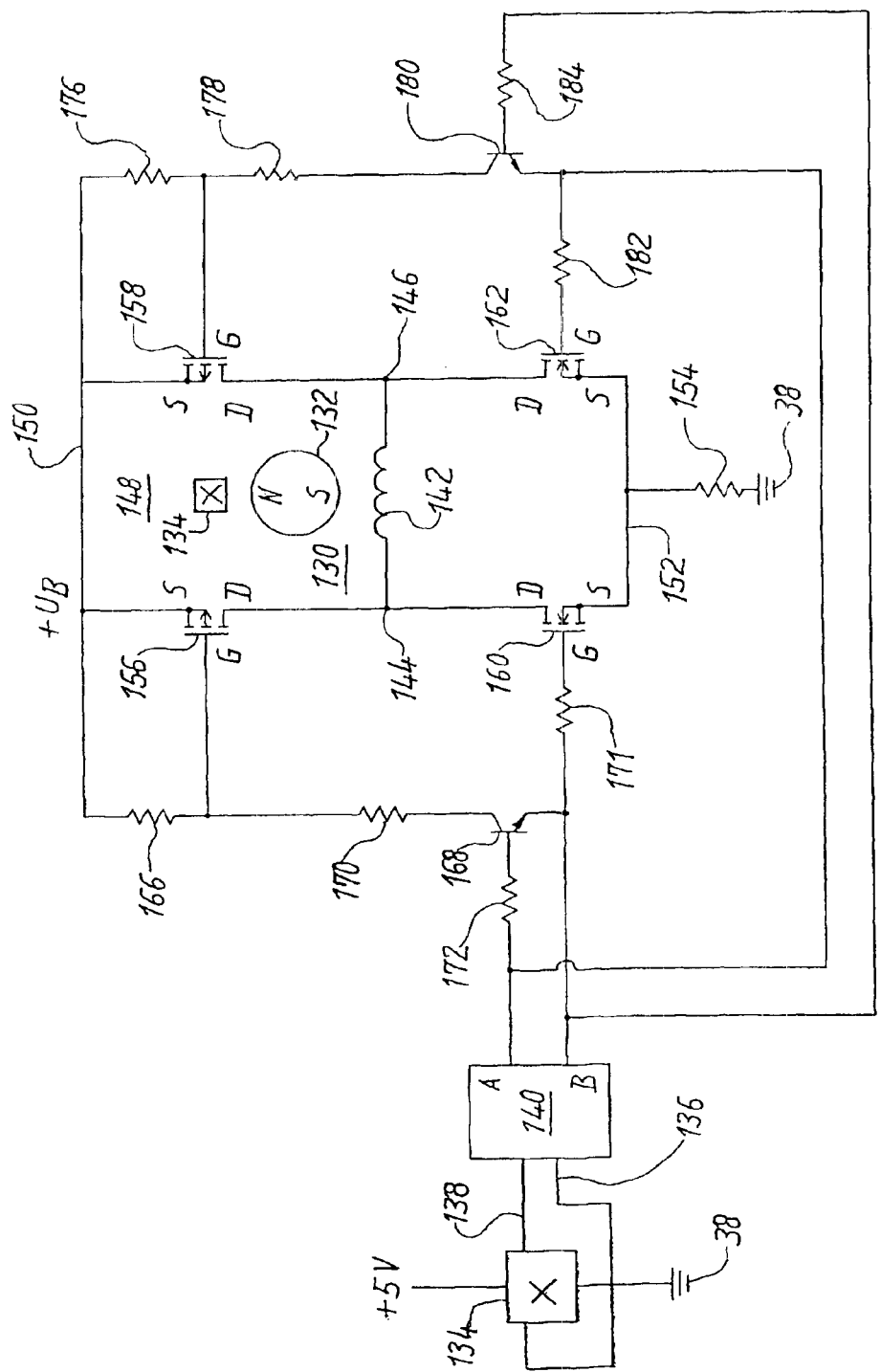
Figure 6:
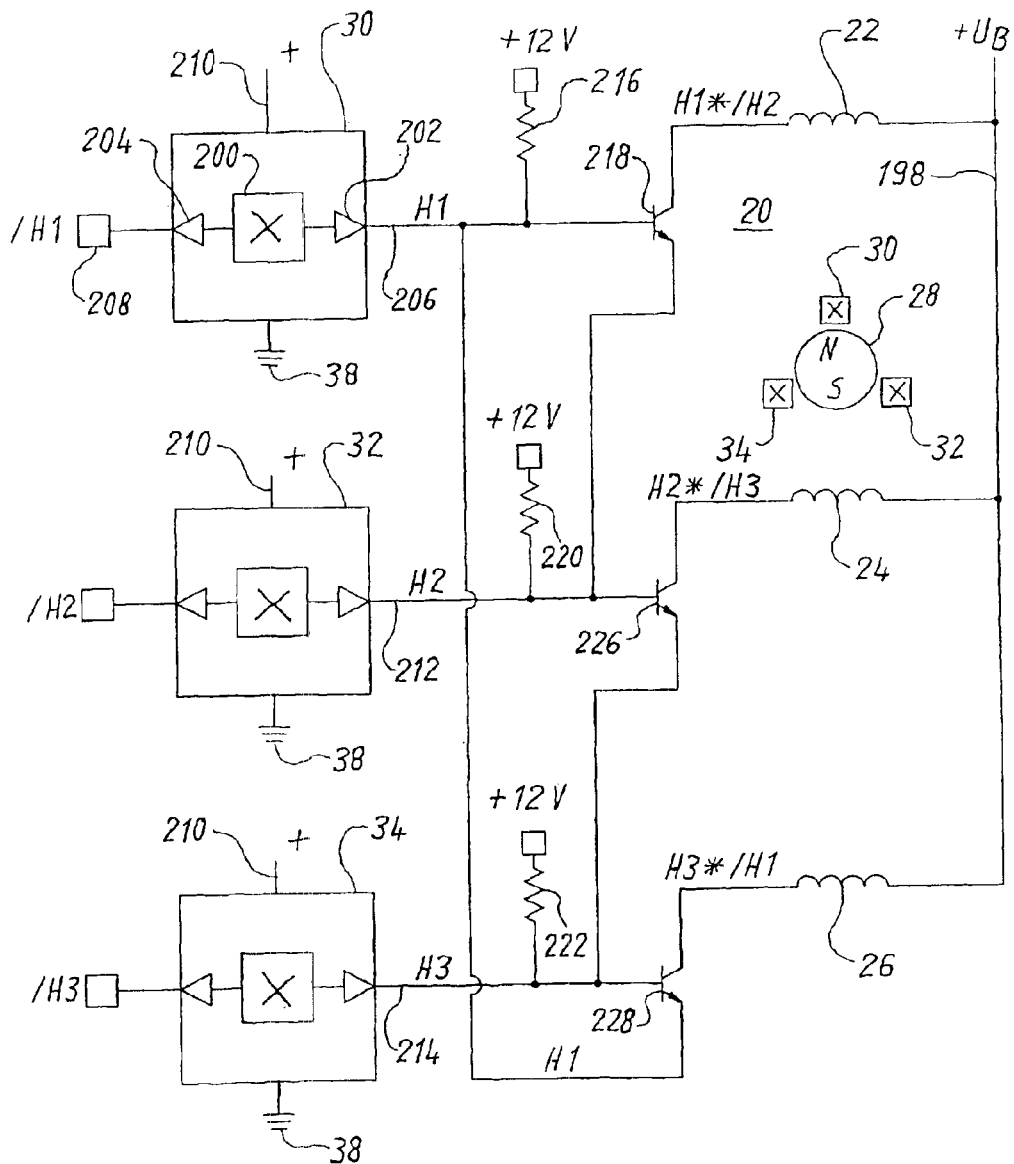
Figure 7:
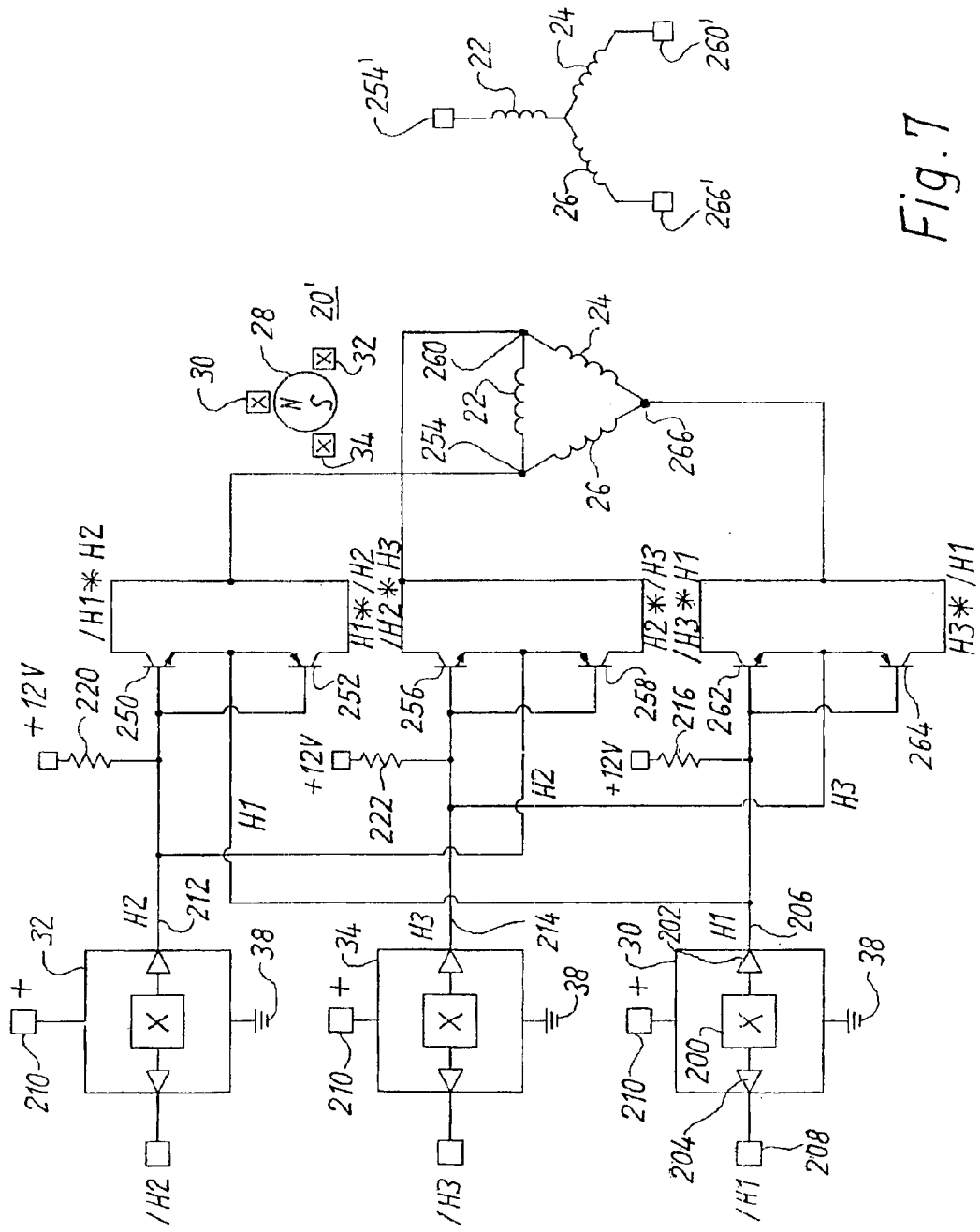

FIG. 3 contains diagrams to explain the invention;

FIG. 4 shows a modification of FIGS. 1 and 2 that allows low-loss operation particularly in instances where the operating voltage $U_B$ of the motor fluctuates within relatively wide limits;

FIG. 5 shows a third embodiment of a motor according to the present invention;

FIG. 6 shows a circuit according to the present invention having a three-phase half bridge; and FIG. 7 shows a circuit having a three-phase full bridge in which the logic transistors are simultaneously used as output stage transistors.

DETAILED DESCRIPTION

FIG. 1 shows, at the right, an electronically commutated motor 20 having three stator winding phases 22, 24, 26 and a symbolically indicated permanent-magnet rotor 28, depicted with two poles, around which three rotor position sensors 30, 32, 34 are arranged at intervals of 120° el. and furnish signals H1, H2, H3. These three sensors are also depicted at the far left in FIG. 1. They are connected in series. Lower sensor 34 is connected via a resistor 36 to ground 38, while upper sensor 30 is connected via a resistor 40 to a positive potential, e.g. to a regulated auxiliary voltage of +5 V. Resistors 36 and 40 are usually identical in size. Sensors 30, 32, 34 are normally Hall sensors, but any other sensors would also be possible, e.g. optical sensors.

The two output signals of Hall sensor 30 are conveyed to the inputs of a comparator 42 whose output 44 (with open collector) is connected via a pull-up resistor 46 to an auxiliary voltage of e.g. +12 V, thus providing at output 44 a signal H1 that has, depending on the position of rotor 28, either the potential of ground 38 or a potential of approx. +12 V. It is very advantageous that this potential can be selected based on the requirements of motor 20. Output 44 is connected via a high-resistance positive feedback resistor 45 to the positive input of comparator 42.

In the same fashion, the two outputs of Hall sensor 32 are connected to the two inputs of a comparator 50 whose output 52 (with open collector) is connected via a pull-up resistor 54 to a defined positive potential, e.g. +12 V, thus providing at output 52 a signal H2 that has, depending on the position of rotor 28, either the potential of ground 38 or a positive potential. Output 52 is connected via a high-resistance positive feedback resistor 53 to the positive input of comparator 50.

The two output signals of Hall sensor 34 are conveyed to the inputs of a comparator 55 whose output 57 (with open collector) is connected via a high-resistance positive feedback resistor 59 to the positive input. Signal H3 is obtained at output 57.

Output 44 is connected via a resistor 56 to the base of an npn control transistor 60 whose emitter is connected to output 52 and whose collector is connected via a resistor 62 and a node 63 to the base of an upper bridge transistor 66, which is depicted as a pnp transistor but alternatively, as indicated, can also be a p-channel MOSFET 66'. Node 63 is connected via a resistor 64 to operating voltage $U_B$. The emitter of transistor 66 is likewise connected to operating voltage $U_B$; its collector is connected via a node 68 to the collector of an npn transistor 70 serving as a lower bridge transistor, whose emitter is connected via a small resistor 72 (for current measurement) to ground 38.

Bridge transistors 66 and 70 constitute one arm of a full bridge circuit 74 whose positive DC voltage line is labeled 76 and whose negative DC voltage line is labeled 78, and which can be connected, for example, to a battery 77 in the manner depicted or to a DC link circuit. Full bridge circuit 74 also contains a pnp transistor 80 that is connected via a node 82 to an npn transistor 84, and contains a pnp transistor 86 that is connected via a node 88 to an npn transistor 90. FIG. 1 explicitly shows only the manner in which transistors 66 and 70 are driven. Transistors 80 and 84, and 86 and 90, are driven in entirely similar fashion but with different corresponding combinations of the output signals of sensors 30, 32, and 34, as explained explicitly in FIG. 3.

According to FIG. 1, winding phase 22 is connected between nodes 68 and 82, winding phase 24 between nodes 82 and 88, and winding phase 26 between nodes 68 and 88. This corresponds to a delta winding configuration. A Y-configured circuit would likewise be possible.

The positive DC voltage line 76 (+$U_B$) is connected via a resistor 64 to the base of transistor 66.

Output 52 of comparator 50 is connected to the emitter of a pnp control transistor 94 whose base is connected via a resistor 96 to output 44, and whose collector is connected (in FIG. 1) to the base of bridge transistor 70 and, via a resistor 98, to ground 38. This collector is also connected to the anode of a diode 100 whose cathode is connected to a PWM generator 102. The latter is also connected via a diode 104 to the base of lower bridge transistor 84, and via a diode 106 to the base of lower bridge transistor 90.

As indicated schematically in FIG. 1, upper bridge transistors 66, 80, 86 can be replaced by p-channel MOSFETs 60', 80', 86'; and lower bridge transistors 70, 84, 90 can similarly be replaced by n-channel MOSFETs 70', 84', 90'. This is depicted in FIG. 1 for MOSFETs 66' and 70'. For MOSFET 66', source S is connected to line 76, drain D to node 68, and gate G to connecting point 63. For MOSFET 70', drain D is connected to node 68, source S to line 78, and gate G to the collector of control transistor 94.

Preferred Values For Components in FIG. 1 k=kilohm, M=megohm. The component values refer to bipolar bridge transistors 66, 70, 80, 84, 86, 90 depicted in FIG. 1, at a $U_B$ of 18 to 33 V.

| Hall sensors 30, 32, 34 | HW101A |
| R 36, 40 | 200 ohms |
| Comparators 42, 50, 55 | LM2901 |
| R 45, 53, 59 | 1 M |
| R 46, 54 | 2.2 k |
| R 56, 96 | 47 k |

-continued

| Transistor 94 | BC847BPN |
| Transistor 60 | BC847B |
| R 62, 64, 98 | 4.7 k |
| Diodes 100, 102, 104 | RB731U |
| Bridge transistors 66, 80, 86 | BD680 |
| Bridge transistors 70, 84, 90 | BD679 |
| Resistor 72 | 56 mOhm |
| Alternatively: | |
| MOSFETs 66', 70', 80', 84', 86', 90' | IRF7343 |

Mode of Operation of FIG. 1

FIG. 3 shows at a), b), and c), for explanatory purposes, the three Hall signals H1, H2, H3 during one revolution of rotor 28 through 360° el.

FIG. 3g) shows examples of the logical values of the Hall signals for rotor positions 1 (30° el.) and 2 (90° el.) through 6 (330° el.).

FIG. 3h) shows that in the rotational position range between 0° and 120° el., transistor 66 is switched on because H1=1 and H2=0, i.e. /H2=1. Similarly, in the rotational position range between 0 and 60° el., lower transistor 84 is switched on because /H2=1 and H3=1. In the rotation angle range from 0° el. to 60° el., current therefore flows from positive DC voltage line 76 through bridge transistor 66, winding phase 22, bridge transistor 84, and resistor 72 to ground 38. Correct commutation is performed for each rotational position range in accordance with the table in FIG. 3h), as is known to one skilled in the art.

In the rotational position range between 0 and 120° el., output 44 of comparator 42 is high-resistance, so that this output, and with it the base of transistor 60, receives a positive potential Hi through resistor 46.

In this rotational position range, output 52 of comparator 50 is connected via comparator 50 internally to ground 38, so that the emitter of transistor 60 is grounded.

Transistor 60 is thus conductive, and a current is obtained through resistors 64 and 62. The voltage drop at resistor 64 is sufficiently large that upper bridge transistor 66 is reliably switched on.

In the angle range between 180° el. and 300° el., /H1=1 and also H2=1, so that lower bridge transistor 70 is switched on.

In this case comparator 50 is high-resistance, so that the emitter of transistor 94 is connected via pull-up resistor 54 to a suitable positive voltage, for example +12V, i.e. H2=1.

In the angle range 180 through 300° el., output 44 of comparator 42 is connected internally to ground 38 so that H1=0 (therefore /H1=1); through resistor 96, the base of transistor 94 acquires approximately the potential of ground 38, so that this transistor 94 conducts and a corresponding voltage drop occurs at resistor 98, switching on lower bridge transistor 70 completely, i.e. with a low internal resistance.

When the output of PWM generator 102 is positive, diodes 100, 104, 106 are blocked, and the gate potentials of lower bridge transistors 70, 84, 90 are not influenced. If that output is at ground potential, however, diodes 100, 104, 106 become conductive and pull the potentials at the bases of lower bridge transistors 70, 84, 90 to a low value, so that the these bridge transistors are blocked.

Particular advantages include:

It is no longer necessary to generate inverted control signals (/H1, /H2).

The circuit can be implemented more easily and more inexpensively on small circuit boards.

Space is obtained on the circuit board for additional motor functions.

Less-expensive components can be used; for example, a two-layer circuit board often is sufficient.

Generation of the control signals for the upper bridge transistor no longer requires an additional transistor ("level converter" transistor).

The lower bridge transistors can be optimally driven. With a MOSFET, the optimum voltage $U_{GS}$ for switching on can be, for example, 15 to 20 V, and corresponding control currents are required. If these values are optimized, as is possible with the invention, the switching-on resistance of lower MOSFET's 70', 84', 90' can then be reduced by 10 to 12%, thus decreasing losses and increasing the motor's efficiency.

A full bridge circuit automatically results in reciprocal locking of the upper and lower bridge transistors, e.g. transistors 66 and 70 or 66' and 70'.

The use of bipolar transistors 66, 70 results in an extremely simple output stage configuration.

If the combination of Hall sensor 30 and comparator 42 is used, a very inexpensive electronic system is obtained and it is often possible to work without a multi-layer circuit board, i.e. with only two layers. If Hall ICs plus multiple layers are used, circuit boards for even smaller motors can then be implemented.

FIG. 2 shows a variant depicting substantially only the parts that differ from FIG. 1. Parts identical, or functioning identically, to ones in FIG. 1 are therefore not described again.

The potential at the collector of transistor 94 is here conveyed to the bases of an npn transistor 110 and a pnp transistor 112, the emitters of which are connected to one another and, via a resistor 114, to gate G of lower transistor 70'.

The collector of transistor 110 is connected, for example, to +12 V, and the collector of transistor 112 is connected to ground 38.

When transistor 94 conducts, transistor 110 acquires a positive potential at its base and switches on, while transistor 112 is blocked. As a result, transistor 70 is quickly switched on.

When transistor 94 is blocked, transistor 110 is also blocked, and transistor 112 acquires a potential of 0 V at its base so that it switches on, thereby pulling gate G of transistor 70 to ground 38 and quickly switching off transistor 70'.

The circuit according to FIG. 2 is especially suitable when the PWM generator is operating at a high frequency, since at 25 kHz the gate capacitance of transistor 70' must be charged and discharged 25,000 times per second; the requisite rapid charge reversal with high currents can be achieved without difficulty by way of the two transistors 110, 112, resulting in a fast switchover and low power loss in lower transistor 70'.

If a bipolar transistor is used for bridge transistor 70', its base can be driven at low resistance, so that the charge carriers are rapidly conveyed to and from the base. The result is a fast switchover with low losses, i.e. good motor efficiency.

Preferred Values for Components in FIG. 2

Values conforming to those in FIG. 1 are not listed.

| Transistors 60, 94, 110, 112 | BC847BPN |
|---|---|
| R 98 | 100 k |
| R 114 | 100 ohms |
| R 54, 64 | 10 k |

FIG. 4 shows a variant for upper control transistor 60. This variant can be used in FIGS. 1 and 2. Identical or identically functioning parts are labeled with the same reference characters as therein, and usually are not described again.

Here the collector of upper npn control transistor 60 is connected directly to gate G of upper p-channel MOSFET 66', and via a resistor 64' to positive DC voltage line 76.

The emitter of control transistor 60 is moreover connected via an emitter resistor 120 to output 52 of comparator 50, i.e. to signal H2, so that transistor 60 acts as a constant-current source when H2=0 and H1=1.

When operating voltage $U_B$ fluctuates, as is normally the case in the context of a vehicle battery 77, the collector current of control transistor 60 remains largely constant because of resistor 120, so that the voltage drop $U_{SG}$ at resistor 64' is also largely constant. That voltage drop can therefore be set, by selecting resistor 64', to a value only slightly lower than the maximum permissible voltage $U_{SG}$ (e.g. 20 V) for switching on p-channel MOSFET 66'. With bipolar bridge transistors, the emitter-base voltage can be set to a value sufficiently high for reliable switching operation. Transistor 60 operates here in the analog range and is therefore faster than if it were operated in saturated mode, thus reducing losses in motor 20.

Preferred Values for Components in FIG. 4

$U_B$=18 to 33 V

Signals H1, H2=+5 V amplitude

| R 64' | 2 k |
|---|---|
| Current I | 4.2 mA |
| R 56 | 10 k |
| R 120 | 1 k |
| $U_{SG}$ | 8.4 V |

FIG. 5 shows a commutation circuit for a so-called single-phase motor 130 having a permanent-magnet rotor 132 that controls a Hall sensor 134, which is depicted again at the far left in FIG. 5 and whose output signals are conveyed to two inputs 136, 138 of a microcontroller 140. This circuit is particularly suitable for economical low-output (i.e. low-current) fans.

Rotor 132 interacts with a single-phase stator winding 142 that is connected between two connection points 144, 146 of an H-bridge 148. The latter has a positive terminal 150 to which an operating voltage +$U_B$ is conveyed, and a negative DC voltage terminal 152 that is connected to ground 38 via a low-resistance measuring resistor 154.

A p-channel MOSFET 156 is located between positive DC voltage terminal 150 and connection point 144 as an upper bridge transistor; a p-channel MOSFET 158 is likewise present between positive DC voltage terminal 150 and connection point 146.

An n-channel MOSFET 160 is located between connection point 144 and negative DC voltage terminal 152 as a lower bridge transistor, and an n-channel MOSFET 162 is present between connection point 146 and negative DC voltage terminal 152. Drains D of the two bridge transistors 156 and 160 are connected to one another, likewise drains D of bridge transistors 158 and 162.

A resistor 166 is located between positive DC voltage terminal 150 and gate G of p-channel MOSFET 156. A resistor 170 is located between gate G of bridge transistor 156 and the collector of an npn control transistor 168. The emitter of transistor 168 is connected directly to output B of microcontroller 140, and via a resistor 171 to gate G of bridge transistor 160. The base of transistor 168 is connected via a resistor 172 to an output A of microcontroller 140.

Gate G of bridge transistor 158 is connected via a resistor 176 to line 150, and via a resistor 178 to the collector of an npn control transistor 180 whose emitter is connected directly to output A and via a resistor 182 to gate G of bridge transistor 162.

The base of transistor 180 is connected via a resistor 184 to output B of processor 140.

Preferred Values for FIG. 5
(k=kilohm)

| | |
|---|---|
| Hall sensor 134 | HW101A |
| R 172 | 22 k |
| Control transistors 168, 180 | BC847B |
| R 166, 176 | 3.3 k |
| R 170, 178 | 4.7 k |
| R 171, 182 | 1 k |
| R 154 | 56 mOhm |
| MOSFETs 156, 158, 160, 162 | IRF7343 |

Mode of Operation of FIG. 5

When microcontroller 140 is operating normally, outputs A and B are alternately high, i.e. when A is high, B is low, and when B is high, A is low.

When output A has a high potential, control transistor 180 is blocked, so that upper bridge transistor 158 is blocked and lower bridge transistor 162 conducts. Output B then has approximately the potential of ground 38, so that control transistor 168 is conductive and a current flows from positive DC voltage terminal 150 through resistors 166, 170 and transistor 168 to output B. As a result, upper bridge transistor 156 acquires a high enough voltage between source and gate to switch it on.

Since output B is grounded, in this case lower bridge transistor 160 receives a low signal at its gate G and becomes blocked.

When output B becomes high and output A low, control transistor 168 is then blocked so that upper bridge transistor 156 is likewise blocked. Lower bridge transistor 160, on the other hand, now receives a positive signal at its gate G and becomes conductive. Control transistor 180 becomes conductive so that upper bridge transistor 158 becomes conductive, while lower bridge transistor 162 is blocked because of the low potential at A.

If a fault in microcontroller 140 or its program causes output B to switch to high while A is still high, lower bridge transistor 160 can then be switched on only during the rising edge of the (incorrect) signal at output B, while upper bridge transistor 156 is still conductive because, directly thereafter, the base and emitter of control transistor 168 acquire the same potential, so that control transistor 168 becomes blocked and upper bridge transistor 156 switches off. The same applies to bridge transistors 158 and 162 on the right side of H-bridge 148.

A current pulse can therefore flow through both bridge transistors 156, 160 only very briefly before control transistor 168 switches off upper bridge transistor 156. This short current pulse does not result in the destruction of bridge transistor 156 and 160, i.e. in the event of a fault in microcontroller 140 or its program, motor 130 remains at a standstill and is not destroyed, because the left-hand control transistor 168 additionally acts in this case as an interlock between MOSFETs 156 and 160. The same is true of right-hand control transistor 180.

FIG. 6 shows a circuit for a three-phase half bridge. The three phases 22, 24, 26 of motor 20 are Y-configured. Star point 198 is connected to $+U_B$.

Motor 20 has a permanent-magnet rotor 28, depicted with two poles, which controls three Hall ICs 30, 32, 34 that are arranged around rotor 28 at intervals of 120° el. These Hall ICs are depicted again at the left in FIG. 6. Three identical power Hall ICs are preferably used here; for example, Hall IC 30 contains a Hall sensor 200 whose two output signals H1 and /H1 are generated by respective comparators 202 and 204 (with open collector). Power Hall ICs of this kind can deliver at their outputs 206, 208 a current of 150 mA when a voltage of +5 V is applied to positive terminal 210, and 100 mA at +12 V.

In FIG. 6, as depicted, only outputs 206, 212, and 214 are used.

Output 206 is connected via a pull-up resistor 216 to a voltage of, for example, +12 V, and directly to the base of an npn control transistor 218, so that this base receives signal H1 from sensor 30. The emitter of transistor 218 receives signal H2 from output 212 of sensor 32, so that, as indicated, the collector of transistor 218 receives the logically combined signal H1*/H2 with which phase 22 is controlled directly; in other words, when output 212 has a low potential and output 206 a high potential, transistor 218 becomes conductive and a current flows from $+U_B$ through phase 22, control transistor 218, and Hall IC 32 to ground 38.

Output 212 of sensor 32 is connected via a pull-up resistor 220 to +12 V, and output 214 of sensor 34 is likewise connected via a pull-up resistor 222 to +12 V.

Phase 24 receives its current through a control transistor 226, and phase 26 through a control transistor 228.

The base of transistor 226 receives its control signal H2 from output 212. Its emitter receives signal H3 from output 214, so that the signal combination H2*/H3, in whose presence a current flows through phase 24, is obtained at the collector of transistor 226.

The base of transistor 228 receives its control signal H3 from output 214, and its emitter receives signal H1 from output 206, so that the signal combination H3*/H1, in whose presence a current flows through phase 26, is obtained at the collector of transistor 228.

This is therefore a very simple commutation circuit for a three-phase motor, with which a low-output motor can be operated in one predetermined rotation direction. Control transistors 218, 226, 228, which provide logical combination of the signals, are here used simultaneously as output stage transistors that control the currents in the three stator phases 22, 24, 26. Hall ICs 30, 32, 34 are in this case connected in parallel to a common power supply 210.

FIG. 7 shows a similar circuit but for a motor 20' whose three-phase stator winding can here be operated, as depicted, in a delta configuration. A connection of the three phases in a Y configuration is also depicted as a variant.

Motor 20', its rotor 28, its winding phases 22, 24, 26, and its three Hall sensors 30, 32, 34 bear the same designations as in FIG. 6 and are therefore not described again. Sensors 30, 32, 34 are depicted again on the left in FIG. 7 and conform to FIG. 6, i.e. are power Hall ICs, so that the reader is referred to the description there; the same applies to pull-up resistors 216, 220, 222.

The circuit according to FIG. 7 is a full bridge circuit for a three-phase motor in which the logical combination transistors not only combine the sensor signals but also directly control the current in motor 20', the motor current flowing as described below through the pull-up resistors and the internal comparators 202 etc.

Output 212 of Hall IC 230 is connected to the bases of an npn control transistor 250 and a pnp control transistor 252, the emitters of which are connected to one another and to output 206. Their collectors are likewise connected to one another and to a node 254 to which phases 22 and 26 are connected.

Output 214 of Hall IC 34 is connected to the base of an npn control transistor 256 and to the base of a pnp control transistor 258, the emitters of which are connected to one another and to output 212. Their collectors are likewise connected to one another and to a node 260 to which phases 22 and 24 are connected.

Output 206 of Hall IC 30 is connected to the base of an npn control transistor 262 and to the base of a pnp control transistor 264, the emitters of which are connected to one another and to output 214. Their collectors are connected to a node 266 to which phases 24 and 26 are connected.

If motor 20' is to be operated in a Y configuration, the windings are connected in accordance with the variant shown at the right in FIG. 7, and node 254 becomes node 254', node 256 becomes node 256', etc., as is known to one skilled in the art of electromechanical engineering.

Mode of Operation of FIG. 7

Control transistor 250 becomes conductive when output 212 (signal H2) is high and output 206 (signal H1) is low. As shown in FIG. 3, this corresponds to the rotation angle range 180–240° el., in which output 214 (signal H3) is low so that control transistor 258 also conducts, since the condition H2*/H3 is met.

A current therefore flows through resistor 220 and transistor 258 to node 260, from there through phase 22 to node 254, and on through transistor 250 and comparator 202 of Hall IC 30 to ground 38, so that winding phase 22 therefore receives current in this rotation angle range. At the same time, a current also flows through series-connected winding phases 24 and 26. Commutation otherwise follows the pattern according to FIG. 3, to which the reader is therefore referred.

This circuit is particularly suitable for low-output motors in which a largely constant torque is required, as is characteristic of three-phase six-pulse motors. Since in this case the logic transistors are simultaneously the output stage transistors of the full bridge circuit, three power Hall ICs 30, 32, 34 and six transistors 250, 252, 256, 258, 262, 264 are sufficient, and the outlay in terms of components is therefore very low for a three-phase six-pulse motor with a full bridge circuit. It is thus possible either to accommodate the components on a very small circuit board or to implement additional functions on a somewhat larger circuit board, as demanded in each individual case by the customer.

Many variants and modifications are of course possible within the scope of the present invention, for example with the use of different transistor types in the power circuit, etc.

What is claimed is:

1. An electronically commutated DC motor that comprises:
    a stator comprising at least one stator winding (22, 24, 26; 142);
    a rotor (28; 132) electromagnetically interacting with the stator;
    a positive DC voltage line (76; 150) and a negative DC voltage line (78; 152) for supplying power to the motor (20);
    a full bridge circuit (74; 148) for controlling the current in the at least one stator winding (22, 24, 26; 142), which full bridge circuit (74; 148) comprises a plurality of bridge arms that each comprise an upper bridge transistor (66; 80, 86; 60'; 156, 158) for controlling the current from the positive DC voltage line (76; 150) to an associated terminal (68; 144, 146) of that stator winding (22, 24, 26; 142) as well as
    a lower bridge transistor (70, 84, 90; 70'; 160, 162) for controlling the current from the relevant terminal (68; 144, 146) of the stator winding (22, 24, 26; 142) to the negative DC voltage line (78; 152);
    an arrangement (134) for generating a plurality of rotor position signals (H1, H2, H3; A, B); and
    an arrangement for controlling a predetermined bridge transistor by logical combination of rotor position signals associated therewith, there being provided, for logical combination of those rotor position signals, a control transistor (60; 94; 168) to the base of which a first rotor position signal (H1; A) is applied and to whose emitter a second rotor position signal (H2; B) is applied, and whose collector signal serves to control the current in an associated stator winding (22, 24, 26; 142).

2. The motor according to claim 1, wherein the control electrode of the predetermined bridge transistor (66; 70; 66', 70'; 156) is connected via
    a resistor (64; 98; 166) to a DC voltage line (76; 150; 78) associated with that bridge transistor.

3. The motor according to claim 1,
    wherein a pnp transistor (66, 80, 86) is provided as an upper bridge transistor; and
    the control transistor for that pnp bridge transistor is implemented as an npn transistor (60).

4. The motor according to claim 1,
    wherein a p-channel MOSFET (66') is provided as an upper bridge transistor; and
    the control transistor for that p-channel MOSFET (66') is implemented as an npn transistor (60).

5. The motor according to claim 3,
    wherein the control transistor (60; 156) for the upper bridge transistor (66; 156) comprises a resistor (129; 170) in its emitter circuit (FIGS. 4, 5).

6. The motor according to claim 1,
    wherein an npn transistor (70, 84, 90) is provided as a lower bridge transistor;
    and the control transistor for that npn transistor is implemented as a pnp transistor (94).

7. The motor according to claim 1,
    wherein an n-channel MOSFET (70') is provided as a lower bridge transistor; and
    the control transistor for that n-channel MOSFET (70') is implemented as a pnp transistor (94).

8. The motor according to claim 7,
    wherein the gate (G) of an n-channel MOSFET (70') is connected to the collector of the control transistor (94) associated with it and, via a resistor (98), to a potential which corresponds substantially to the potential of the negative DC voltage line (78; 152).

9. The motor according to claim 1,
    wherein the signal at the collector of a control transistor (94) associated with a lower bridge transistor (70; 70') is amplified, prior to delivery to the control electrode of that lower bridge transistor (70), by means of an amplifier (110, 112) that has substantially a two-point characteristic curve.

10. The motor according to claim 1,
    wherein there is connected to the control electrode of at least one lower bridge transistor (70; 70') a PWM signal generator (102) which, in the context of a corresponding PWM signal, blocks that lower bridge transistor (70; 70') by reducing its control voltage.

11. The motor according to claim 10,
    wherein the PWM signal generator (102) is connected, via a member (100, 104, 106) conducting in only one direction, to the control electrode of the associated lower bridge transistor (70, 84, 90; 70').

12. The motor according to claim 1, wherein the full bridge circuit is implemented as an H-bridge (148) which comprises two p-channel MOSFETs (156, 158) as upper bridge transistors and two n-channel MOSFETs (160, 162) as lower bridge transistors;

and two opposite-phase rotor-position-dependent signals (A, B), of which one is applied to the base and the other is applied to the emitter of a control transistor (168) implemented as an npn transistor, thereby serving to control that control transistor (168).

13. The motor according to claim 12, wherein the collector of a control transistor (168) is connected via a resistor (170) to the gate (G) of the upper bridge transistor (156) associated with it, which gate is connected via a resistor (166) to the positive DC voltage line (150).

14. The motor according to claim 12, wherein one of the rotor-position-dependent signals (B) is applied to the emitter of the control transistor (168) and, through a resistor (170), to the gate (G) of the associated lower bridge transistor (160).

15. The motor according to claim 2, wherein a pnp transistor (66, 80, 86) is provided as an upper bridge transistor; and the control transistor for that pnp bridge transistor is implemented as an npn transistor (60).

16. The motor according to claim 13, wherein one of the rotor-position-dependent signals (B) is applied to the emitter of the control transistor (168) and, through a resistor (170), to the gate (G) of the associated lower bridge transistor (160).

17. An electronically commutated DC motor that comprises:

a stator comprising a plurality of stator winding phases (22, 24, 26);

a rotor (28) electromagnetically interacting with the stator;

a positive DC voltage line (198) and a negative DC voltage line (38) for supplying power to the motor (20);

a bridge circuit for controlling the current in the stator winding phases (22, 24, 26), which bridge circuit comprises a plurality of bridge arms that each comprise at least one transistor (218, 226, 228) for controlling the current from the DC voltage lines (38, 198) to an associated stator winding phase (22, 24, 26);

an arrangement (30, 32, 34) for generating a plurality of rotor position signals (H1, H2, H3);

an arrangement for driving a transistor (218, 226, 228) controlling the current in an associated stator winding phase (22, 24, 26), by logical combination of the rotor position signals (H1, H2, H3) associated with that transistor, by the fact that a first of those associated rotor position signals (H1) is applied to its base, and a second of those associated rotor position signals (H2) is applied to its emitter.

18. The motor according to claim 17, wherein said at least one transistor (218, 226, 228) associated with a respective stator winding phase (22, 24, 26) is arranged in the respective electrical circuit of said stator winding phase.

19. The motor according to claim 17, wherein there is provided, for generation of a rotor position signal (H1, H2, H3), a rotor position sensor (200) which comprises at its output a comparator (202, 204) that is implemented as a comparator with an open collector and that constitutes, in each case, a part of the electrical circuit of a presently switched-on stator winding phase (22, 24, 26).

20. The motor according to claim 18, wherein there is provided, for generation of a rotor position signal (H1, H2, H3), a rotor position sensor (200) which comprises at its output a comparator (202, 204) that is implemented as a comparator with an open collector and that constitutes in each case a part of the electrical circuit of a presently switched-on stator winding phase (22, 24, 26) (FIG. 6).

* * * * *

UNITED STATES PATENT AND TRADEMARK OFFICE
CERTIFICATE OF CORRECTION

| | | |
|---|---|---|
| PATENT NO. | : 6,903,526 B2 | Page 1 of 1 |
| APPLICATION NO. | : 10/493983 | |
| DATED | : June 7, 2005 | |
| INVENTOR(S) | : Wilhelm Weisser, Walter Heydrich and Hermann Rappenecker | |

It is certified that error appears in the above-identified patent and that said Letters Patent is hereby corrected as shown below:

1. On the Title Page, Item (75) "Georgen" should be --St. Georgen--

2. In column 3, line 48, "60'" should be --66'--

3. In column 4, line 33, "Hi" should be --H1--

4. In column 9, line 62, "60'" should be --66'--

Signed and Sealed this

Twenty-first Day of August, 2007

JON W. DUDAS
*Director of the United States Patent and Trademark Office*